Dec. 31, 1940.  F. P. SCULLY ET AL  2,227,322
AUDIBLE SIGNALING DEVICE FOR USE WITH TANKS
Filed Aug. 4, 1939
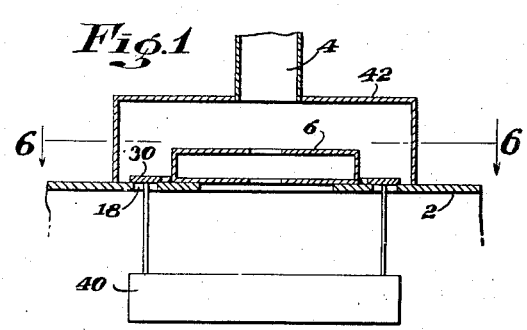
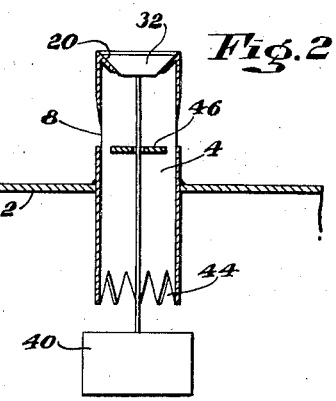
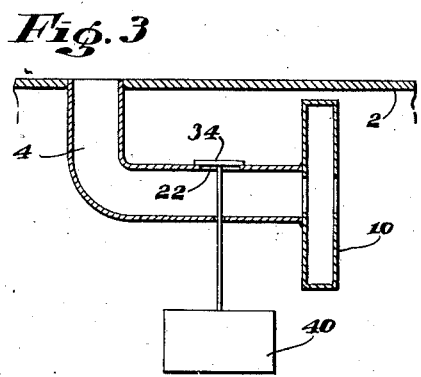
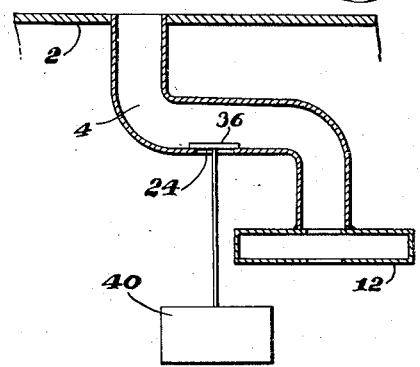
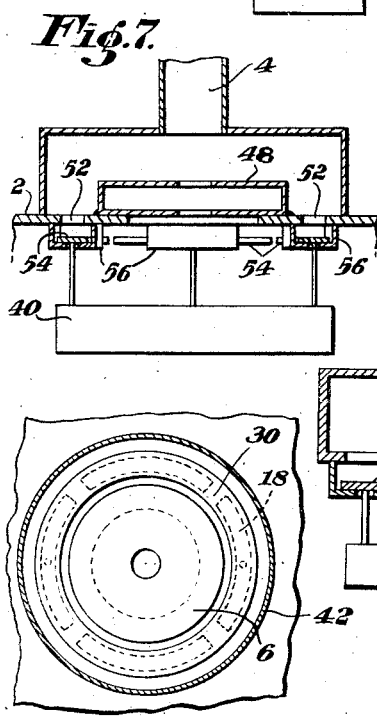
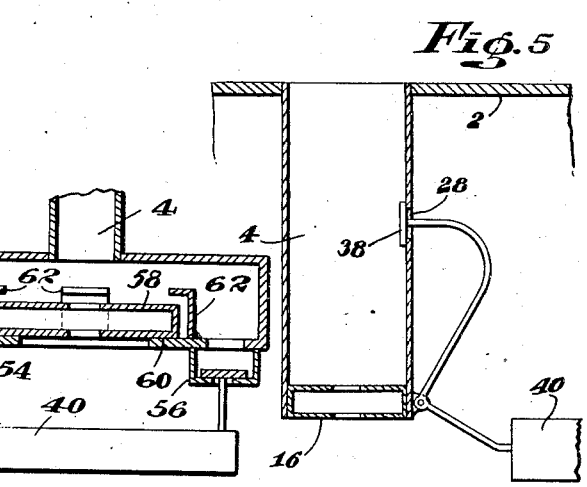
INVENTORS
Frank P. Scully
Alcide E. Mathey
BY Cfardley Chittick
ATTORNEY Patented Dec. 31, 1940

2,227,322

UNITED STATES PATENT OFFICE 2,227,322

AUDIBLE SIGNALING DEVICE FOR USE WITH TANKS

Frank P. Scully, Cambridge, and Alcide E. Mathey, Auburndale, Mass., assignors to Scully Signal Co., East Cambridge, Mass., a corporation of Massachusetts Application August 4, 1939, Serial No. 288,364

6 Claims. (Cl. 137—111)

This invention relates to means for indicating the level of a liquid in a tank and has particular reference to audible signaling means for indicating when the level of the liquid has risen to a predetermined point.

Audible signaling means for indicating liquid levels in tanks are old in general, as, for example, as shown by the United States patents to Mathey, No. 2,135,522, Crossley, No. 2,143,476 and Mathey No. 2,143,706. In all of the patents just mentioned it is contemplated that as the liquid level in the tank rises, the displaced gas will escape through the vent pipe which has therein a whistle positioned in the path of the gases capable of producing an audible signal under the pressures available.

When the liquid level rises to a certain predetermined level in the aforesaid patents, the gas through one means or another is cut off, deflected or otherwise modified in its path through the whistle so that whistling ceases, thereby indicating to the operator the position of the liquid level in the tank.

The present invention contemplates the provision of other specific means for signaling to the operator the condition of the liquid level within the tank. In the present application a whistle is provided in series with the vent pipe so that escaping gases will pass therethrough to cause an audible sound. In one form of the invention the whistle is fixed in relation to the tank, and cessation of whistling is brought about through the by-passing of escaping gases about the whistle, the by-pass in turn being opened through the actuation of a float influenced by the rising liquid level. In another form of the invention the whistle is silent during the filling operation by virtue of gases escaping through a by-pass about the whistle, but upon the liquid level reaching the desired point, the by-pass is closed so that gases thereafter pass through the whistle to produce an audible signal.

The invention will be more particularly pointed out as the description proceeds with the aid of the accompanying drawing in which:

Fig. 1 discloses a fixed whistle having an annular float-operated by-pass.

Fig. 2 shows a fixed whistle of another type having a float-operated by-pass.

Fig. 3 shows a whistle set in vertical position and attached to the vent pipe which extends into the tank, the vent pipe having a float-operated by-pass therethrough.

Fig. 4 shows a whistle in horizontal position connected to the vent pipe extending into the tank, the vent pipe having a float-operated by-pass therethrough.

Fig. 5 shows a whistle fixed with relation to a vertical vent pipe and a float-operated by-pass above the whistle.

Fig. 6 is a section on the line 6—6 of Fig. 1.

Fig. 7 shows a modification in which the by-pass is normally open and the whistle is silent during filling.

Fig. 8 is a detail of a further modification in which the whistle is free to move upwardly off its seat a limited distance to provide an additional safeguard against excessive pressures.

A description of Figs. 1 to 6 will be given first, to be followed by a description of the forms shown in Figs. 7 and 8.

Referring now to the drawing, in all of the figures 2 represents the top of a tank adapted to receive liquids. This tank has at some convenient place a suitable filling connection, not shown, through which liquid may enter.

In each of the figures, with the exception of Fig. 6, is shown the venting connection of the tank, as at 4. Gases, escaping under normal conditions as the tank is being filled, must pass through a whistle positioned in series in the vent line, as at 6 in Fig. 1, 8 in Fig. 2, 10 in Fig. 3, 12 in Fig. 4, and 16 in Fig. 5.

The whistle may be in any convenient form but preferably it should be operable at low pressures to give a distinctly audible sound. Suitable audibility may be obtained from the button type whistle shown in Figs. 1, 3, 4 and 5, or from the apertured tube type, as shown in Fig. 2.

The whistle must be of such construction that it will cease whistling or its audibility will be markedly altered as soon as additional apertures to the venting connection are formed through which the gas may pass. That is to say, while some of the gas may continue to flow through the whistle, still no sound will be heard due to the rest of the gas flowing through a by-pass apart from the whistle apertures.

Such by-passes are provided at 18 in Fig. 1, 20 in Fig. 2, 22 in Fig. 3, 24 in Fig. 4, and 26 in Fig. 5. These by-passes are normally held closed by valves gravitationally maintained. In Fig. 1 the valve is shown as an annular member 30; in Fig. 2 as a cone-shaped valve 32; in Fig. 3 as a disk valve 34; in Fig. 4 as a disk valve 36; and in Fig. 5 as a disk valve 38.

Connected to each of the valves that close the several by-passes are floats indicated at 40 in the several figures. These floats are mechanically connected to the valves closing the by-passes so that when the liquid level rises in the tank to reach the floats 40, the latter will in due course be raised from their present positions to open the by-passes, thus permitting a portion of the gases to escape to the atmosphere by means of the by-passes rather than necessitating all of the gases passing through the whistle apertures.

From the drawing it is believed clear that when the liquid level has risen to a predetermined point in the tank, the by-passes will automatically be opened. This causes whistling to cease, thereby indicating to the operator that the tank is substantially full.

In every case it is provided that even though the liquid level may continue to rise, as might be the situation if the operator failed to turn off the supply, the full venting capacity will still be available, for the whistle apertures plus the by-passing orifices will be open.

In Fig. 1 the whistle is in a fixed position above the by-passing valve. In Figs. 2, 4 and 5 the whistle is below the by-passing valve, while in Fig. 3, the whistle and by-pass are on the same general level.

The floats are so arranged that at the termination of their upward movement they do not in any way close the vents. Thus, for example, float 40 in Fig. 1 would stop its upward movement before engagement with the underside of the tank by virtue of valve 30 coming in contact with the surrounding housing 42.

In Fig. 2 the lower end of the vent pipe 4 is arranged in saw-tooth fashion, as at 44, so that gas or liquid will be free to pass into vent pipe 4 when the upward movement of float 40 has been checked by engagement with the teeth. The disk 46 in the tubular type whistle shown in Fig. 2 provides an annular area, through which gas may pass, considerably in excess of the area of whistle ports 8, so that the opening of valve 32 takes care of the excess capacity that is presented by the disk in relation to the tube. When valve 32 is closed, the gas is directed along the wall by disk 46 so that whistling takes place, but upon opening of the valve 32 the resonance of the chamber is so altered that whistling ceases.

In Figs. 3, 4 and 5 the upward movement of float 40 obviously in no way impedes the venting capacity.

A further advantage of the constructions shown in Figs. 1, 2, 4 and 5 is this: If, during filling, the pressure within the tank becomes excessive, the valves 30, 32, 36 and 38, which close auxiliary ports 18, 20, 24 and 28 respectively, will be raised from their seats to provide an auxiliary vent. This extra venting capacity enables the pressures to be maintained within safe limits. However, when the valves are opened under conditions of excess pressure, but before the liquid level has risen far enough to operate the floats, the pressure differential between the inside and the outside of the whistle remains such that gas continues to flow through the whistle in such volume that audibility remains. When the liquid level, however, rises to a point to raise the floats, then the auxiliary ports are opened wider through the further movement of the various valves. Because of the excess capacity of the auxiliary ports that is provided when the floats are moved upwardly, the pressure differential between the inside and outside of the whistle is decreased to such an extent that whistling ceases.

In this manner the auxiliary ports serve a dual purpose; namely as a relief against excessive pressure conditions during filling without destroying audibility of the whistle, and as a relief of such capacity when operated through the raising of the floats that audibility of the whistle ceases when the tank is filled to the desired point.

In practice the valves are so adjusted that they will open at predetermined pressures which are well within the safe capacity of the tank.

Having now described the constructions disclosed in Figs. 1 to 6 inclusive, a description will be given of the modified forms shown in Figs. 7 and 8.

In Fig. 7 the whistle is designated as 48 and is secured to the tank in fixed position. The supplementary vent 52 that surrounds the whistle is of the same general nature as vent 18 shown in Figs. 1 and 6. An annular valve 54 is provided, which, however, is on the underside of port 52 rather than on the topside, as shown in Fig. 1. Valve 54 is supported a short distance below port 52 by supports 56 which may take any convenient form. The supports may act as a guide for directing valve 54 toward the aperture 52. The float 40 is connected to valve 54 by any suitable means so that upward movement of float 40 will result in closure of supplementary port 52.

In this construction during filling the gas is free to escape both through the whistle and supplementary port 52, but due to the fact that the whistle apertures are relatively small in comparison to the supplementary port, only a small volume of gas passes through the whistle, so that no sound is produced.

When the liquid level rises so that port 52 is closed, the gas at once escapes in greater volume through the whistle, which thereupon becomes audible, indicating that the tank has been filled.

In order to insure against dangerous pressure conditions developing after the tank has been filled, which condition is unlikely inasmuch as the operator will ordinarily turn off the entering liquid as soon as the signal has been given, the modified construction shown in Fig. 8 has been provided. In this case the whistle 58, instead of being fixed to the tank top, as in Fig. 7, is free to move a limited distance off its seat 60 so that gas may escape from the tank not only through the whistle apertures but also around the whistle. Upward movement of the whistle is limited by stops 62 which serve to prevent the whistle from moving upwardly under conditions of excessive pressure to a point where it might engage the upper housing, thereby seriously restricting the venting capacity.

From the foregoing descriptions it will be seen that constructions have been provided in which the whistle is affected by the operation of a float-controlled valve in conjunction with a supplementary vent to provide indications of the liquid level to the operator; but while we have shown and described preferred forms of our invention, we wish it to be distinctly understood that we do not intend to be limited thereby but only by the appended claims.

We claim:

1. The combination with a tank for liquid having a vent passage with a valve seat formed therein, of an air operated signal connected to said passage at a point above said seat, a valve member normally positioned on said seat to close said passage and divert air to said signal, and a float in the upper part of said tank connected to unseat said valve and open said passage when the liquid in said tank rises to a predetermined level.

2. An audible signaling device for use with a tank, comprising a venting connection in the form of a tube extending downwardly into said tank, an aperture in the side of said tube connecting with the exterior of the tank and formed to produce a whistling sound when gas passes therethrough, the outer end of said tube forming a seat, a valve resting on said seat and normally closing the said outer end, buoyant means within said tank and connected to said valve, and means for preventing said buoyant means from sealing said tube when raised by rising liquid.

3. An audible signaling device for use with a tank for liquid, comprising a venting connection for said tank, a whistle normally open and positioned in said venting connection in fixed relation to said tank in the path of venting gases whereby said whistle will produce an audible sound during normal filling of said tank, a by-pass in said venting connection, a valve normally closing said by-pass, buoyant means connected to said valve, said valve adapted to be raised from its seat to open said by-pass by gass pressure in excess of a predetermined degree without causing discontinuance of said whistle or by the upward movement of said buoyant means when the latter is raised by a rising liquid level to cause the discontinuance of said whistle, and whereby in either case the venting capacity of said tank will be increased.

4. An audible signaling device for use with a tank for liquid, comprising a vent passage including a whistle, a supplementary vent passage for by-passing gas about said whistle, separate valve means operable apart from said whistle for closing said supplementary vent, and buoyant means connected to said valve means for varying the condition of said supplementary vent upon the rising of liquid in said tank to a predetermined level.

5. An audible signaling device for use with a tank for liquid, as set forth in claim 4, in which said whistle is fixed with respect to said tank.

6. An audible signaling device for use with a tank for liquid, as set forth in claim 4, in which said audible signaling device is movable under conditions of excessive pressure only to provide increased venting capacity.

FRANK P. SCULLY.
ALCIDE E. MATHEY.